United States Patent
Lu et al.

[11] Patent Number: 6,142,626
[45] Date of Patent: Nov. 7, 2000

[54] CHROMATIC VISION CORRECTION RESIN GLASSES WITH REDUCED CONCAVE REFLECTION

[75] Inventors: Zhong Lu; Weidong Lu, both of Chang Chin, China

[73] Assignee: University of Science and Technology of China, Heifei, China

[21] Appl. No.: 09/360,028

[22] Filed: Jul. 23, 1999

[30] Foreign Application Priority Data

Jul. 24, 1998 [CN] China .................................. 98 1 16821

[51] Int. Cl.[7] ....................................................... G02C 7/10
[52] U.S. Cl. ............................................................ 351/163
[58] Field of Search .................................. 351/44, 47, 48, 351/49, 159, 163, 165, 166, 177, 178, 213

[56] References Cited

U.S. PATENT DOCUMENTS

| 4,268,134 | 5/1981 | Gulati et al. | 351/163 |
| 4,878,748 | 11/1989 | Johansen et al. | 351/44 |

FOREIGN PATENT DOCUMENTS

| 1073266A | 6/1993 | China . |
| 2149637Y | 12/1993 | China . |
| 2150568Y | 12/1993 | China . |
| 1109480A | 10/1995 | China . |
| 1165967A | 11/1997 | China . |

*Primary Examiner*—George Manuel
*Attorney, Agent, or Firm*—Patterson, Thuente & Skaar, P.A.

[57] ABSTRACT

The chromatic vision correction resin glasses with reduced concave reflection is manufactured according to the following steps. First, the resin eyeglass is dyed chemically to meet the requirements of 4 sorts (21 kinds) of chromatogram correction curves. Second, the convex of resin eyeglass is coated in a vacuum environment with a CF film, the thickness of which should be controlled to make the light permeability of the dyed resin eyeglass decrease about 10% to lower the reflection of its concave. Third, in order to reduce concave reflection further, it is practicable to coat the concave with permeance promotion film by evaporation. This technique can eliminate the visual disturbance of eyes imaging which occurs in the surrounding of intensive light. As a result, the effect of chromatic vision correction is improved. Meanwhile, it also can diminish the production cost, increase productivity, so that it not only achieves the aim of chromatic vision correction, but also has the effect of eyes' protection.

3 Claims, 1 Drawing Sheet

CHROMATIC VISION CORRECTION RESIN GLASSES WITH REDUCED CONCAVE REFLECTION

CROSS-RELATED PATENT APPLICATION

This application claims priority to Chinese Patent Application No. 98116821.3, entitled, "The Chromatic Vision Correction Resin Glasses With Reduced Concave Reflection," as filed on Jul. 24, 1998.

BACKGROUND OF THE INVENTION

1. Field of the Invention

The present invention relates to the chromatic vision abnormality correction glasses in physical area of international patent classification, especially to a kind of chromatic vision correction resin glasses with reduced concave reflection.

2. Description of Related Art

Since the early 1980's, chromatic vision correction has been investigated widely and enthusiastically in the world, and a lot of correction methods have been put forward. For instance, a Japanese medicine Wu Min Shan Tian, Ph.D. cooperating with Japanese Doctor Association created a point stimulation remedy called, "JPJG" (just point, just channel) using the new technique of electronics. It was reported that method was admirably effective, but hasn't been popularized because of its short effective duration. The patents which use chromatic vision glasses to rectify achromatopsia and other chromatic vision abnormality are listed as followed: American U.S. Pat. No. 4,300,819, German Patent No. 3209655; Japanese Patent No. 59148027, and Chinese Patent No. 87214130 which discloses a kind of achromatopsia or other chromatic vision abnormality glasses invented by Wenging Zhao. Most of them weren't put into the commercial production because of their poor corrective effect or ugly shape.

In the early 1990's China has achieved significant breakthrough in achromatopsia correction field. We can observe that in many Chinese patents such as, Chinese Patent No. 90110297.0; 91111430.0; and 96105219.8. The technical breakthrough was realized by evaporatedly plating an optical film on the optical eyeglass to make it possess the spectrum curve of chromatic vision correction. At present, this kind of glasses is available in market.

But there are still some shortcomings existing with the above chromatic vision correction glasses. For one thing, the optical glass is fragile so that it may be harmful to eyes. For another, the concave reflection of optical glass will cause disturbance because of eyes' imaging. As a result, users will feel faint or their vision will be affected unfavorably. There is a need in the industry for corrective lenses that avoid the aforementioned problems.

SUMMARY OF THE INVENTION

The goal of the present invention is to provide a kind of resin glasses which can eliminate the disturbance caused by eyes' imaging through reducing concave reflection. As a result, the corrective effect is improved.

The chromatic vision correction resin glasses with reduced concave reflection of the present invention are made of resin eyeglass which has been dyed chemically and coated in a vacuum environment. The glasses of the present application possess 4 sorts (I. II. III. IV.) of chromatogram correction curves. Each of them is subdivided into a, b, c three levels and a, b, c, d, e, f six levels, so that we can get 21 kinds of glasses. First, the resin eyeglass is dyed chemically. The design requirements of 4 sorts (21 kinds) of chromatogram correction curves can be realized through different ratio among red, green, and blue dye. After the dyeing treatment, the convex of resin eyeglass is coated with a reflection film in a vacuum environment (the material of reflection film can be Si, Ti or Cr).

Referring to FIG. 1, the thickness of the film must be controlled to make the light permeability of dyed resin eyeglass decrease about 10%. In order to reduce concave reflection further, it is practicable to coat the concave with permeance promotion film by evaporation. This technique can eliminate the visual disturbance of eyes' imaging which occurs in the surrounding of intensive light. As a result, the effect of chromatic vision correction can be improved.

The technical index of sorts (21 kinds) of chromatic vision correction resin glasses are as follows:

I. The first sort of chromatogram parameters:

the deviation of wave length ±100 A the deviation of permeability ±2%

| Wave length | 6300 A | 5400 A | 4500 A |
|---|---|---|---|
| Transmission of light | | | |
| a | 85% | 30% | 50% |
| b | 82% | 25% | 45% |
| c | 78% | 15% | 35% |
| d | 55% | 10% | 25% |
| e | 40% | 5% | 15% |
| f | 33% | 2% | 5% |

II. The second sort of chromatogram parameters:

the deviation of wave length ±100 A the deviation of permeability ±2%

| Wave length | 6300 A | 5400 A | 4500 A |
|---|---|---|---|
| Transmission of light | | | |
| a | 85% | 8% | 20% |
| b | 80% | 5% | 15% |
| c | 70% | 5% | 15% |
| d | 60% | 5% | 15% |
| e | 40% | 3% | 3% |
| f | 20% | 1% | 1% |

III. The third sort of chromatogram parameters:

the deviation of wave length ±100 A the deviation of permeability ±2%

| Wave length | 6300 A | 5400 A | 4500 A |
|---|---|---|---|
| Transmission of light | | | |
| a | 75% | 50% | 35% |
| b | 70% | 40% | 30% |
| c | 58% | 30% | 20% |
| d | 45% | 25% | 15% |
| e | 42% | 10% | 5% |

-continued

| Wave length | 6300 A | 5400 A | 4500 A |
|---|---|---|---|
| f | 28% | 5% | 2% |

IV. The fourth sort of chromatogram parameters:
the deviation of wave length ±100 A
the deviation of permeability ±2%

| Wave length | 6300 A | 5400 A | 4500 A |
|---|---|---|---|
| Transmission of light | | | |
| a | 50% | 20% | 15% |
| b | 35% | 9% | 7% |
| c | 20% | 2% | 2% |

The advantages and positive effect of the present invention:
1. The glasses are safe and reliable for they are not easy to rupture.
2. The reduction of concave reflection relieves the visual disturbance caused by eyes' imaging, so that the visual clearness is enhanced greatly. The wearers will feel comfortable and never feel faint.
3. Because the spectrum curves are rearranged and tend to be more reasonable, the color of glasses is lighter and more beautiful than that of a current pair. The light transmission will be increased after permeance promotion (anti-reflective) film has been coated on the concave of eyeglass. A patient who wears it can enhance the ability of color discernment.
4. It's easy to produce and the production cost is low.

BRIEF DESCRIPTION OF THE PREFERRED EMBODIMENTS

Figure 1:
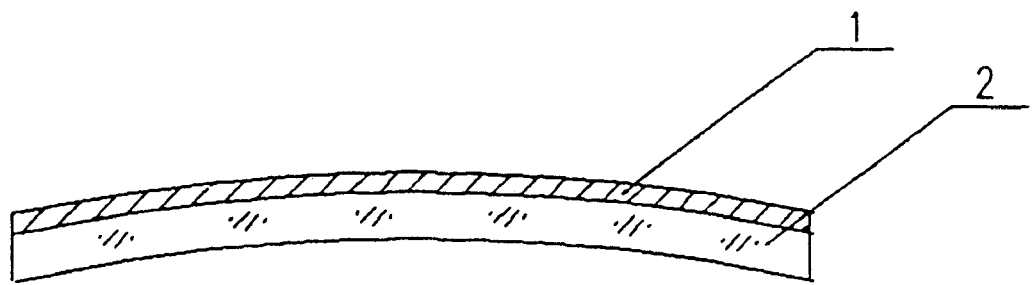
FIG. 1 is the cross section of resin eyeglass whose convex is coated with a reflection film.
Figure 2:
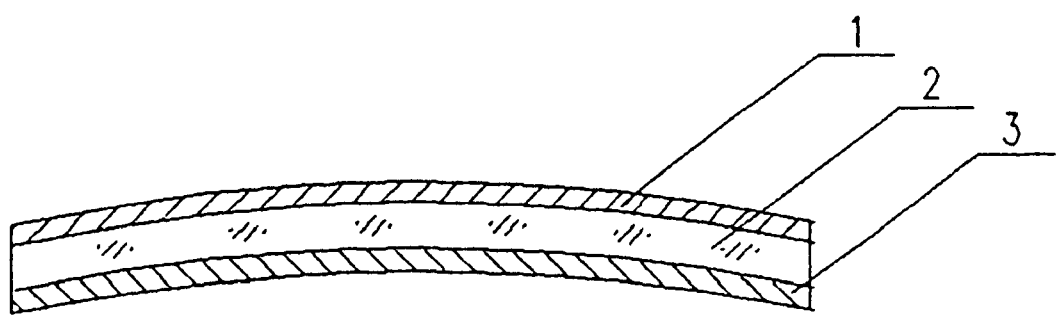
FIG. 2 is the cross section of resin eyeglass whose concave and convex are coated with permeance (anti-reflective) promotion film and reflection film respectively.

CR-39 resin sheets are dyed chemically in compound dye to produce four sorts (21 kinds) of eyeglass, then the convex front surface of the eyeglass is coated with three sheets of reflection films which consist of Sio2 and TiO2 or three sheets with a reflection film of Cr.

The technological parameters of the formation of the three sheets of reflection films of Sio2 TiO2 and Sio2 are listed as follows:

| material | vacuum degree (pa) | central wavelength (nm) | thickness of the optical film (nm) | temperature of the basic eyeglass (C) |
|---|---|---|---|---|
| Sio2 | 4 × 10³ | 490 | 122.5 | ambient temperature |
| TiO2 | 4 × 10³ | 490 | 245.0 | ambient temperature |
| Sio2 | 4 × 10³ | 490 | 122.5 | ambient temperature |

The technological parameters of the formation of a sheet of reflection film of Cr are listed as follows:

| material | vacuum degree (pa) | central wavelength (nm) | thickness of the optical film (nm) | temperature of the basic eyeglass (C) |
|---|---|---|---|---|
| Cr | 4 × 10³ | 490 | 122.5 | ambient temperature |

Then the convex back surface of the eyeglass is coated with permeance promotion (anti-reflective) film. Thus, we can obtain a series of glasses which can relieve or even eliminate sufferings of lots of patients.

What is claimed is:

1. A chromatic vision correction resin glasses lenses with reduced concave reflection comprising:

a. a resin eyeglass lens substrate, which consists of 4 sorts (21 kinds) being dyed chemically;

b. a sheet of reflective film being coated on the concave front surface of the resin eyeglass lens substrate; and c. a sheet of permeance promotion anti-reflective film being deposited on the convex back surface of the resin eyeglass lens substrate wherein the said 4 sorts (21 kinds) of chemically dyed resin eyeglass lens are selected from a plurality of sorts of chromatogram parameters consisting of:

A first sort of chromatogram parameters:
the deviation of wave length ±100 A
the deviation of permeability ±2%

| Wave Length | 6300 A | 5400 A | 4500 A |
|---|---|---|---|
| Transmission of light | | | |
| a. | 85% | 30% | 50% |
| b. | 82% | 25% | 45% |
| c. | 78% | 15% | 35% |
| d. | 55% | 10% | 25% |
| e. | 40% | 5% | 15% |
| f. | 33% | 2% | 5% |

A second sort of chromatogram parameters:
the deviation of wave length ±100 A
the deviation of permeability ±2%

| Wave Length | 6300 A | 5400 A | 4500 A |
|---|---|---|---|
| Transmission of light | | | |
| a. | 85% | 8% | 20% |
| b. | 80% | 5% | 15% |
| c. | 70% | 5% | 15% |
| d. | 60% | 5% | 15% |
| e. | 40% | 3% | 3% |
| f. | 20% | 1% | 1% |

A third sort of chromatogram parameters:
the deviation of wave length ±100 A the deviation of permeability ±2%

| Wave Length | 6300 A | 5400 A | 4500 A |
|---|---|---|---|
| Transmission of light | | | |
| a. | 75% | 50% | 35% |
| b. | 70% | 40% | 30% |
| c. | 58% | 30% | 20% |
| d. | 45% | 25% | 15% |
| e. | 42% | 10% | 5% |
| f. | 28% | 5% | 2% |

And a fourth sort of chromatogram parameters:

the deviation of wave length ±100 A the deviation of permeability ±2%

| Wave Length | 6300 A | 5400 A | 4500 A |
|---|---|---|---|
| Transmission of light | | | |
| a. | 50% | 20% | 15% |
| b. | 35% | 9% | 7% |
| c. | 20% | 2% | 2%. |

2. The chromatic vision correction resin glasses lenses with reduced concave reflection according to claim 1 wherein the reflection film includes one or more of the materials selected from the group consisting of Silicon dioxide ($SiO_2$), Titanium dioxide (TiO2) and Chromium (Cr).

3. A chromatic vision correction resin glasses lenses with reduced concave reflection comprising:
   a. a resin eyeglass lens substrate, the substrate being dyed chemically;
   b. a sheet of reflective film being coated on the concave front surface of the resin eyeglass lens substrate, wherein the reflection film includes one or more of the materials selected from the group consisting of Si, Ti, and Cr; and
   c. a sheet of permeance promotion anti-reflective film being deposited on the convex back surface of the resin eyeglass lens substrate.

* * * * *